V. H. SPINKS.
COUNTER AND BIN.
APPLICATION FILED SEPT. 29, 1920.
1,398,161.
Patented Nov. 22, 1921.
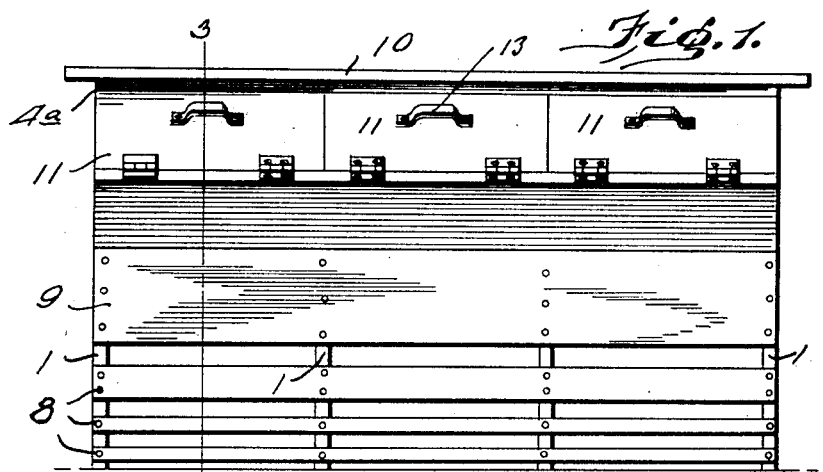
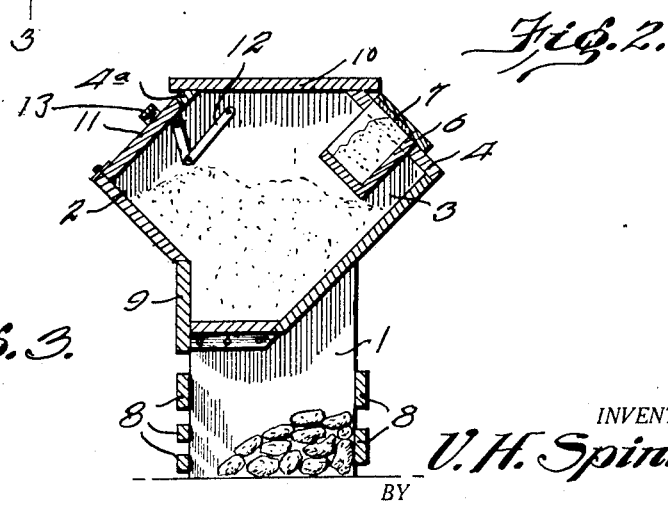
INVENTOR.
V. H. Spinks.
BY
Geo. P. Kimmel
ATTORNEY.
Witness

UNITED STATES PATENT OFFICE.

VIRGIL H. SPINKS, OF RUSTON, LOUISIANA.

COUNTER AND BIN.

1,398,161.  Specification of Letters Patent.  Patented Nov. 22, 1921.

Application filed September 29, 1920. Serial No. 413,523.

*To all whom it may concern:*

Be it known that I, VIRGIL H. SPINKS, a citizen of the United States, residing at Ruston, in the parish of Lincoln and State of Louisiana, have invented certain new and useful Improvements in a Counter and Bin, of which the following is a specification.

This invention relates to counters for grocery stores, and the object thereof is to provide a combination counter and display bin which is cheap to manufacture so as to be within the reach of small as well as large grocers, which is equipped with ventilated compartments for fresh vegetables and with closed compartments for dry groceries, the latter being dust, insect and rodent proof and yet the contents thereof are visible from the front of the counter so that purchasers may see just what they are buying.

Another object is to provide doors for the bins containing the dry groceries which are equipped with stops to limit the opening movement of the doors so that all goods pouring from a scoop or bag will drop onto the door and be returned to the bin, thereby avoiding waste.

With these and other objects in view, the invention consists in certain novel features of construction as hereinafter shown and described and then specifically pointed out in the claim, and in the drawings illustrative of the preferred embodiment of the invention.

In the accompanying drawing:

Figure 1 represents a front elevation of a combined bin and counter constructed in accordance with this invention.

Fig. 2 is a rear elevation thereof; and

Fig. 3 is a transverse vertical section taken on the line 3—3 of Fig. 2.

In the embodiment illustrated a plurality of longitudinally spaced upright boards 1 is arranged to form partitions between the bins and to support at their upper ends a top or counter 10. These upright partitions 2 have enlarged upper ends projecting laterally edgewise beyond the bottom portions of the partitions and which are designed to form combined end members and partitions for the hopper-like bins 3 which are superposed above the bins formed by the body portions of the partitions 1, the lower bins being designed to contain green vegetables, while the upper bins 3 are closed and are designed to contain dry groceries such as coffee, tea, beans, rice and the like. These bins 3 have their side walls flared and mounted on the upper edges thereof are inwardly inclined members 4 and 4ª designed to form the front and rear of the bins. The member 4 has a plurality of sight openings 5 therein closed by transparent covers to permit the contents to be inspected from the front of the counter. If desired a sample container 6 in the form of a drawer may be mounted in each opening 5 and protected by a transparent pane 7 so that the contents of the bin or a sample thereof will always be visible to the purchaser even when the quantity for sale in the bin is low.

The front and rear edges of the body portions of the partitions 1 are connected by longitudinally disposed vertically spaced cross bars or slats 8, those at the rear of the bin being extended the full height thereof to form closures therefor, while those at the front terminate short of the tops of the bins to permit the contents to be removed and inserted.

As shown the upper cross bar 9 at the rear of the bins is of double or triple width so as to completely close them at this point.

Hinged closures 11 are provided for closing the rear of the bins 3 and open downwardly being provided with stops 12 to limit their opening movement and to hold the closures in position to form supporting shelves on which the containers to be filled are designed to be supported. These shelves are held so as to be inclined downwardly and inwardly to provide for any material dropped on the shelves being directed back into the bins avoiding waste. As shown these downwardly opening hinged closures 11 are preferably equipped with hand grips 13 to facilitate the opening and closing thereof.

If desired auxiliary partitions 14 may be used to increase the number of upper bins and reduce their size.

From the above description it will be obvious that a combined counter and bin constructed as herein shown and described may be manufactured at a very low cost so that any grocers may be able to purchase it. It may of course be decorated and finished to suit the purchaser and thus be rendered more or less expensive as desired.

These combined counters and bins may be readily moved from place to place and thus facilitate cleaning out of the lower bins, the bottoms of which may be either formed by the floor or have removable bottoms mounted therein.

The preferred embodiment of the invention is disclosed in the drawings and set forth in the specification, but it will be understood that any modifications within the scope of the claim may be made in the construction without departing from the principle of the invention or sacrificing any of its advantages.

What is claimed is:

A combined bin and counter comprising a plurality of longitudinally spaced uprights, a counter connecting the upper ends of said uprights, said uprights having edgewise disposed lateral extensions at their upper ends, the upper edges of said extensions being inclined downwardly and outwardly and their lower edges inclined downwardly and inwardly, crossbars connecting the edges of said uprights, boards connecting the upper and lower edges of said extensions to form hopper-like bins below said counter, the boards connecting the lower edges of said extensions at one side projecting into the space between said uprights, and those connecting the upper edges of said extensions forming upper front and rear walls for the bin, a bottom member arranged between said projecting side boards and the uppermost of said cross bars, said bins being equipped with sight openings in the upper front wall and with closures in their upper rear walls to afford access to the interior of the bins.

In testimony whereof, I affix my signature hereto.

VIRGIL H. SPINKS.